United States Patent [19]

Tsurunaga et al.

[11] 4,349,062
[45] Sep. 14, 1982

[54] HIGHLY DURABLE PNEUMATIC TIRE COMPRISING BIAS LAID CARCASS CONSTRUCTION FORMED OF SUPERIMPOSED STACKED PLIES

[75] Inventors: Yasuaki Tsurunaga, Kodaira; Masaru Abe, Sayama; Hideaki Hashimoto, Musashino; Junichi Tsuzura, Urawa, all of Japan

[73] Assignee: Bridgestone Tire Company Limited, Tokyo, Japan

[21] Appl. No.: 150,498

[22] Filed: May 16, 1980

Related U.S. Application Data

[63] Continuation of Ser. No. 938,145, Aug. 30, 1978, abandoned.

[30] Foreign Application Priority Data

Sep. 6, 1977 [JP] Japan ................................ 52-106285

[51] Int. Cl.³ .................... B60C 9/06; B60C 15/00
[52] U.S. Cl. ........................ 152/356 R; 152/354 R; 152/359; 152/362 R
[58] Field of Search ........ 152/354 R, 354 RB, 356 R, 152/356 A, 355, 357 R, 358, 359, 362 R, 362 CS

[56] References Cited

U.S. PATENT DOCUMENTS

| | | | |
|---|---|---|---|
| 2,317,912 | 4/1943 | Howe | 152/356 |
| 2,990,870 | 7/1961 | Vittorelli | 152/356 |
| 4,257,469 | 3/1981 | Uemura | 152/359 |

*Primary Examiner*—Edward C. Kimlin
*Assistant Examiner*—Lois E. Boland
*Attorney, Agent, or Firm*—Sughrue, Mion, Zinn, Macpeak & Seas

[57] ABSTRACT

A highly durable pneumatic tire comprising a bias laid carcass construction formed of superimposed stacked plies is disclosed. The tire comprises a carcass body composed of at least two kinds of ply groups including cords whose diameters are different from one another. The ply groups are arranged such that the cords of outer plies are smaller in diameter than those of inner plies.

6 Claims, 6 Drawing Figures

FIG_2
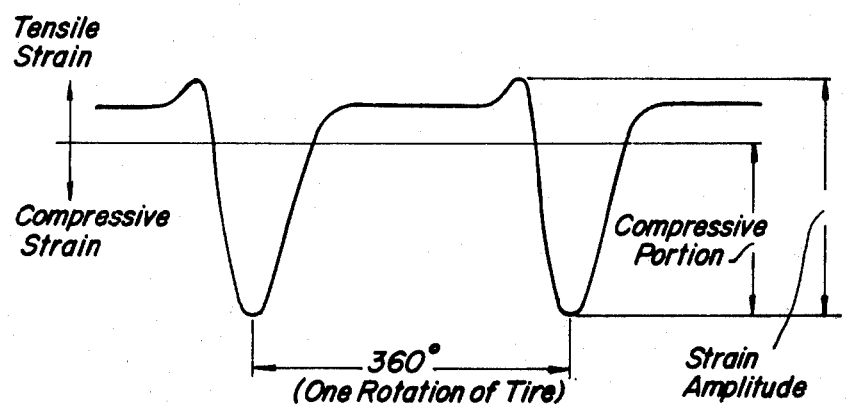
FIG_3
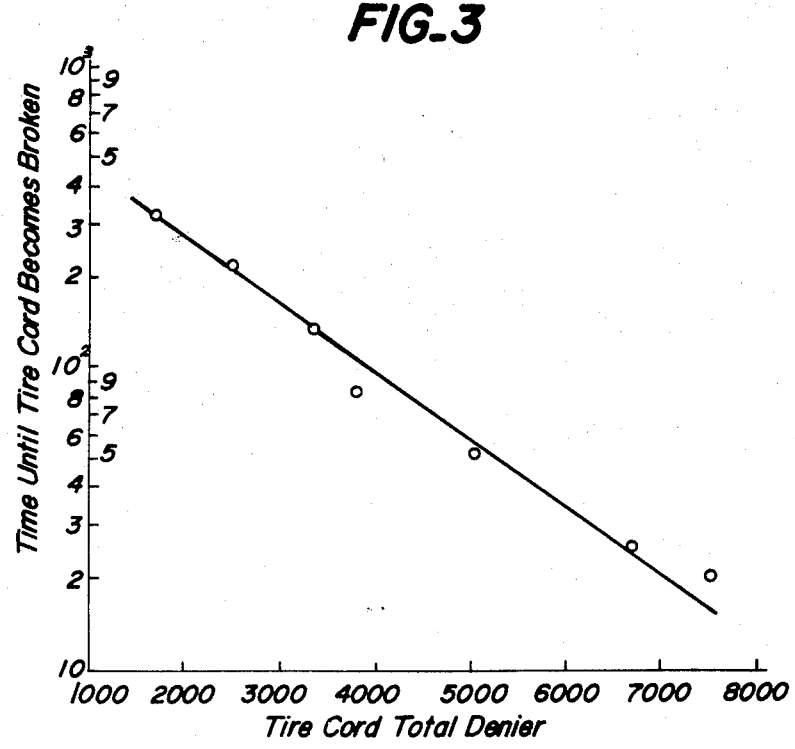

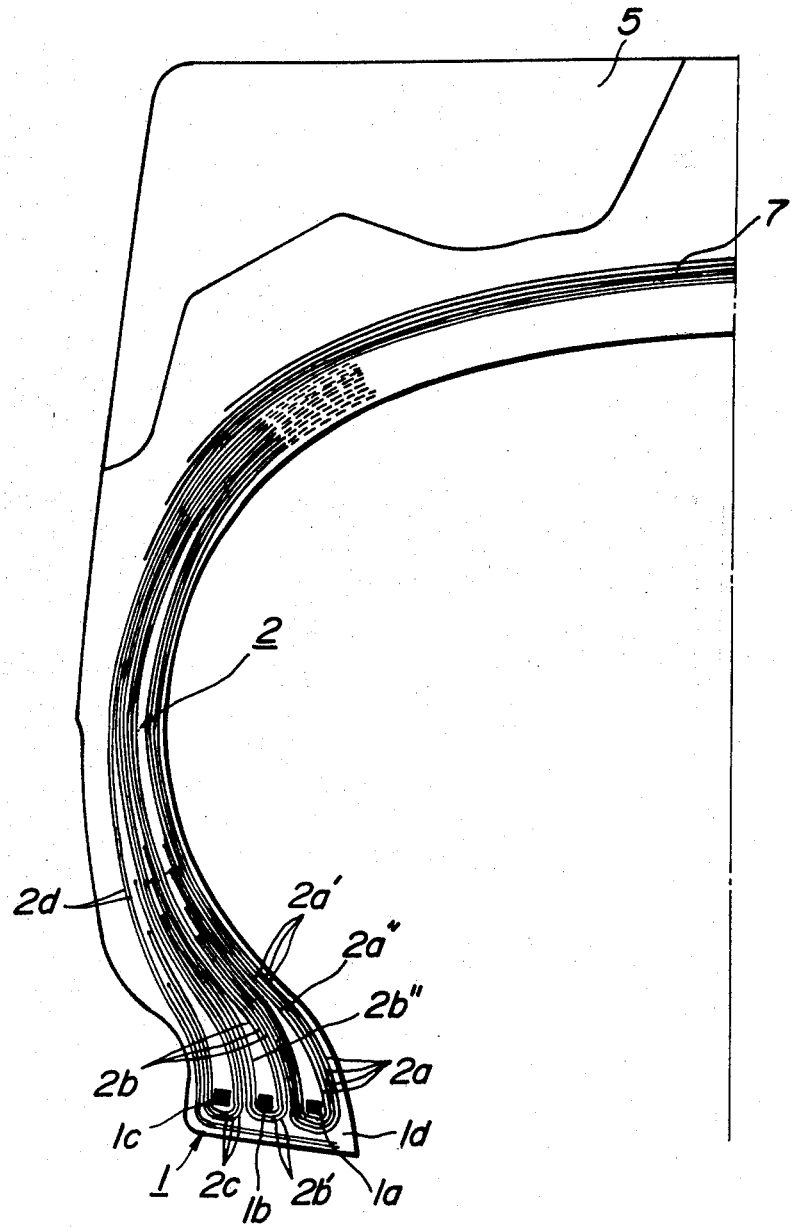

HIGHLY DURABLE PNEUMATIC TIRE COMPRISING BIAS LAID CARCASS CONSTRUCTION FORMED OF SUPERIMPOSED STACKED PLIES

This is a Continuation, of application Ser. No. 938,145, filed Aug. 30, 1978, now abandoned.

BACKGROUND OF THE INVENTION

1. Field of the Invention

This invention relates to pneumatic tires for heavy duty road vehicles and more particularly to a highly durable pneumatic tire comprising a bias laid carcass construction formed of superimposed stacked plies each including rubberized organic textile cords.

The tire according to the invention is mainly used for large type trucks, construction vehicles, agricultural vehicles, industrial vehicles, airplanes or the like.

2. Description of the Prior Art

The above mentioned kind of tire, that is, the tire comprising the bias laid carcass construction formed of superimposed stacked plies each including the rubberized organic textile cords has a number of advantages, but has a few drawbacks. The most important drawback consists in that the number of carcass plies must be considerably increased in order to give the tire that strength which is required when the tire is in use.

In a tire comprising a carcass body formed of the most popular nylon cord of 1,260 denier/2 strands, the number of carcass plies becomes usually 10 to 20, and in a large tire the number of these carcass plies eventually exceeds 40.

It is clear that the use of such large number of the superimposed stacked carcass plies results in a decrease in production efficiency and increase in manufacturing cost of the tire if compared with a steel radial tire which makes use of only one carcass ply even when the tire is large in size.

Heretofore it has been proposed to make the diameter of the cord of the carcass ply large and hence make the number of filaments large so as to increase the strength per cord in order to decrease the number of the carcass plies while maintaining the strength required for the tire. For example, if a carcass cord of 1,890 denier/2 strands is used instead of a carcass cord of 1,260 denier/2 strands, the former becomes 3/2 times higher in the cord strength and becomes about ¾ times smaller in the number of plies than the latter. The former does not become ⅔ times smaller in the number of plies than the latter as expected by calculation owing to the fact that the number of cords must be reduced for the purpose of maintaining a certain gap between the cords. As a result, it is possible to reduce the required number of plies from 30 to the order of 22.

Such conventional method has the drawback that the carcass plies reduced in number tend to increase a cord breaking failure which is a complete tire failure.

The cord breaking up failure means a tire failure in which the cords of the carcass ply become broken due to the following reasons. That is, the cord breaking failure seldom occurs when the tire is in use under proper conditions, but occurs when the internal pressure of the tire becomes extremely small or the tire is subjected to heavy load or sudden shocks or the tire size is erroneously selected and hence the carcass strength becomes insufficient.

Experimental tests have yielded the result that, if the carcass is the same in strength, the use of a cord having a large diameter induces the cord breaking failure more frequently than the use of a cord having a small diameter.

SUMMARY OF THE INVENTION

An object of the invention, therefore, is to provide a highly durable pneumatic tire comprising a bias laid carcass construction formed of superimposed stacked plies each including organic textile cords, which can eliminate the above mentioned drawbacks which have been encountered with the prior art techniques, that is, which can reduce the number of carcass plies without inducing a cord breaking failure and hence can improve a production efficiency and lower a manufacturing cost and which can improve resistance to the cord breaking failure without deteriorating the productivity.

A feature of the invention is the provision of a highly durable pneumatic tire comprising a bias laid construction carcass body composed of a plurality of superimposed stacked plies each including rubberized organic textile cords, the cords of about one half of said plies and the cords of the remaining plies being angularly disposed with respect to the peripheral center line and oppositely inclined with each other, characterized in that said carcass body is composed of at least two kinds of ply groups including cords whose diameters are different from one another and that said ply groups are arranged such that the cords of outer plies are smaller in diameter than those of inner plies.

Another features of the invention are as follows.

(1) A carcass body is composed of two kinds of ply groups including cords whose diameters are different from each other and a ratio between cord diameters of respective ply groups is 1:0.89 to 0.62.

(2) The carcass body composed of two kinds of ply groups including cords whose diameters are different from each other is formed of superimposed stacked plies having a ratio of the number of plies of the ply group including cords of small diameter to total number of plies excluding turn-up portions of each ply at a region intermediate between the maximum width position of the tire and the bead portion thereof lies within a range between 0.10 and 0.88.

(3) A carcass body is composed of three kinds of ply groups including cords whose diameters are different from one another and a ratio among cord diameters of respective ply groups is 1:0.89 to 0.62:0.73 to 0.40.

(4) The carcass body composed of three kinds of ply groups including cords whose diameters are different from one another is formed of superimposed stacked plies having a ratio of the number of plies of the ply group including cords of intermediate diameter to total number of plies excluding turned-up portions of each ply at a region intermediate between the maximum width position of the tire and the bead portion thereof lying within a range between 0.11 and 0.78 and a ratio of the number of plies of the ply group including cords of small diameter to said total number of plies at said region lying within a range between 0.07 and 0.60.

BRIEF DESCRIPTION OF THE DRAWINGS

FIG. 2 is a graph showing strains produced and measured in the region shown in FIG. 1;

FIG. 3 is a graph showing the relation between the total denier of the tire cord and the time until the tire cord becomes broken due to occurrence of repeated rotation fatigue; and FIGS. 4, 5 and 6 are vertical center sections through the rotational axis of embodiments of a pneumatic tire according to the invention, respectively.

DETAILED DESCRIPTION OF THE INVENTION

Figure 1:
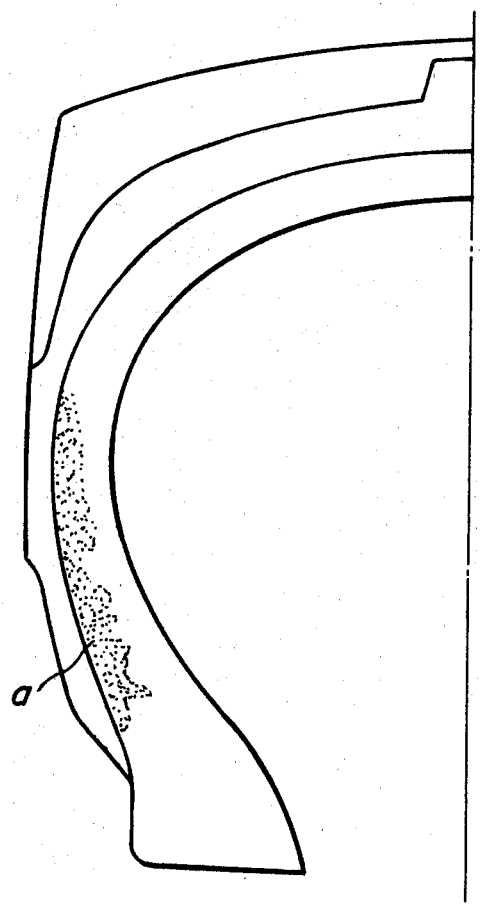
FIG. 1 is a vertical center section through the rotational axis of a conventional tire showing a region where a cord breaking failure is induced.

In general, both a large denier cord having a large outer diameter and a small denier cord having a small outer diameter are formed of filaments whose outer diameters are the same with each other. As a result, the large denier cord is different in the total number of the constitutional filaments from the small deniers cord. In addition, the twisted constructions of these large and small denier cords are so designed beforehand by textile engineers that both the cords have the same theoretical stress-strain curve.

As a result, it has been recognized that the theoretical or experimental fatigue characteristics of these cords are not different from each other. Whether the large denier cord is used or the small denier cord is used is suitably selected by matching characteristics other than the fatigue resistant property required for such kind of tire, such for example, as the cut resistant property, burst resistant property, separation resistant property, resistance to wear, heat generation property or the like with the productivity of the tire.

In the conventional tire so designed that the strains produced in various parts of the tire are substantially equal with each other, the fact that the cord breaking failure more frequently occurs in the tire comprising the large denier cords than the tire comprising the small denier cords could not be made clear.

This invention is based on the discovery of the cause of the above mentioned fact relating to the conventional tire.

Inventors' detailed observations and experimental tests have demonstrated the result that the cord breaking failure is induced by compressive fatigue produced owing to repetition of compressive strains produced in the carcass cords when the tire is rotated under load.

In the first place, the inventors have investigated in detail the cord broken surface where the cord breaking failure occurs and recognized from the state of the broken surface of the cord constitutional filaments that the cord breaking failure is caused by the fatigue breakage of the filament per se. But, as far as the above mentioned "established theory of the prior art techniques relating to the cord fatigue" that there is no theoretical or experimental difference between the fatigue of the large denier cord and the fatigue of the small denier cord, it is difficult to understand the difference between these two kinds of fatigues which have really been produced.

The inventors have some doubt about "the established theory of the prior art techniques relating to the cord fatigue" owing to the fact that the above established theory is contradictory to the real phenomenon.

That is, investigations on foundations for "the established theory of the prior art techniques relating to the cord fatigue" have demonstrated the result that since the cord is inherently subjected to the tensile stress, both theoretical developments and experimental tests have been carried out on the basis of the tensile strain or stress, and that hence the above mentioned established theory should precisely be applied to the tensile strain only and could not be applied to the compressive strain.

The inventors have recognized that the tensile stress subjected to the cord when the tire is inflated is $\frac{1}{2}$ to $\frac{2}{3}$ times smaller than that subjected to the crown portion of the tire and that the compressive strain produced in the carcass as a whole when the tire is rotated under load is concentrated into a region intermediate between the side portion of the tire and the bead portion thereof, particularly, into a region between the outer carcass ply and the intermediate carcass ply as shown in FIG. 1 by a where the cord breaking failure occurs. As a result, the inventors have measured the behavior particularly strain produced in the cords in the above mentioned region when the tire is rotated under load and found out that a large compressive strain is produced in the cords in such region. Tensile and compressive strains produced during one rotation of the tire are shown in FIG. 2.

As described above, the inventors have recognized the compressive characteristic of the cord from the consideration on "the established theory of the prior art techniques relating to the cord fatigue" and from the behavior of the cord strain. Experimental tests and investigations have demonstrated the result that the fatigue resistant property of the cord when the tire is subjected to the compressive strain becomes suddenly decreased in response to the increase of the cord diameter or its total denier.

Such inventors' recognitions will now be described with reference to a practical example. In the present example, use was made of a hollow cylinder formed of rubber and having an outer diameter of 40 mm and an inner diameter of 20 mm. The cylinder was closed at each end and provided at its outer layer with cords to be tested, the cords being equidistantly arranged in parallel with the axial direction of the cylinder. The cylinder was inflated by applying an internal pressure therein. This rubber cylinder was bent such that its axis was inclined at an angle of 90° and then the bent rubber cylinder was mounted on a fatigue testing machine. One of the bent portions of the rubber cylinder was rotated about its center axis at a speed of 100 r.p.m. while the other bent portion is rotatably supported so as to give compressive fatigue to the cords.

That is, the cords at the bent portion were subjected to the tensile strain when they arrive at the outside of the bent portion during the rotation of the rubber cylinder and subjected to the compressive strain which was two times larger than the tensile strain when they arrive at the inside of the bent portion during the rotation of the rubber cylinder.

FIG. 3 is a graph showing the above mentioned test result. In the graph shown in FIG. 3, the time until the rubber cylinder cord to be tested becomes broken due to the compressive fatigue is plotted in logarithmic scale on the ordinate and the total denier of the cord to be tested is plotted on the abscissa.

As seen from FIG. 3, as the total denier of the cord, that is, the cord diameter is increased, its compressive fatigue resistant property becomes rapidly decreased.

The invention is based on the above mentioned novel recognition. In order to attain the above mentioned object, the inventors have effected experimental tests and investigations on the above mentioned kind of tire carcass in association with the above mentioned object and found out the fact that the optimum result can be obtained by the basic illucidation of the following conditions and by bringing all of the following conditions into harmony with each other.

A: Dispersion and alleviation of strain subjected to a region between the side portion of a tire and the bead portion thereof, and B: Suppression of the cord fatigue.

In the present invention, the carcass body is composed of a plurality of rubberized plies, each ply including parallel cords formed of organic fiber such as nylon. The total number of plies is divided into substantially two halves which are angularly disposed with respect to the peripheral center line of the tire and oppositely inclined with each other to provide a bias laid construction as in the case of the prior art techniques.

It is most desirous to provide even number of superimposed stacked plies and oppositely incline the cords of adjacent plies with each other. But, the adjacent plies may locally extend in the same direction. It is not always necessary to make the plies whose cords extend in different directions the same in number.

Such carcass body is composed of at least two kinds of ply groups whose cord diameters are different from one another. These composite ply groups are arranged such that the cord diameter is made gradually small from the inner ply toward the outer ply.

That is, a first ply group includes cords having one cord diameter, a second ply group includes cords having another cord diameter and an nth ply group includes cords having a cord diameter which is different from that of the previous (n−1)th group. At least two kinds of these plurality of ply groups are combined such that that ply group which includes cords having relatively the largest diameter is arranged near the inner ply of the carcass body and that the ply group which includes cords having relatively the smallest diameter is arranged near the outer ply of the carcass body. It is preferable that in the intermediate ply the remaining ply groups are arranged such that the cord diameters become smaller in a stepwise manner from the inner ply toward the outer ply.

In the present invention, for practical convenience' sake, the cord diameter is defined by the thickness of the rubberized parallel textile cords.

The above mentioned two kinds of ply groups make use of cords whose cord diameter ratio lies within a range of 1:0.89 to 0.62. If the cord diameter ratio is smaller than 1:0.89, the cord breaking resistant property can not fully be improved. As a result, the lower limit of the cord diameter ratio is made 1:0.89. On the contrary, if the cord diameter ratio is larger than 1:0.62, the number of plies including cords having small cord diameter and required for maintaining the same carcass strength becomes excessively large, thereby considerably increasing the thickness of the carcass. If the carcass becomes considerably large in thickness, the compressive strain produced in that region of the carcass as a whole which is located between the side portion of the tire and the bead portion thereof becomes large, and as a result, the compressive strain produced in the cords is also increased and hence even though the cords having the small diameter are used, sufficient improvement in the cord breaking resistant property could not be obtained.

In addition, if the cord diameter ratio becomes excessively large, an excessively large shearing strain is produced in the boundary surface between adjacent ply groups including those cords having the above mentioned cord diameter ratio, thereby deteriorating the separation resistant property of the tire.

In the present invention, the two kinds of ply groups including the cord diameter ratio within the above mentioned range are arranged substantially intermediate the maximum width position of the tire and the bead portion thereof such that a ratio of the number of plies of the ply group including cords having small diameter to the total number of plies excluding the turned-up portion of each ply lies within a range between 0.10 and 0.88, preferably a range between 0.13 and 0.67.

If the ratio of the number of plies including cords having small cord diameter to the total number of plies is smaller than 0.10, it is impossible to sufficiently improve the cord breaking resistant property, and as a result, 0.10 is made the lower limit.

On the contrary, if the ratio of the number of plies including cords having small cord diameter to the total number of plies exceeds 0.88, that drawback which is exhibited when the cord diameter ratio is excessively large occurs. That is, the number of plies including cords having small cord diameter and required for maintaining the same carcass strength becomes excessively large, thereby considerably increasing the thickness of the carcass. If the carcass becomes considerably large in thickness, the compressive strain produced in that region of the carcass which is located between the side portion of the tire and the bead portion thereof becomes considerably large, and as a result, compressive strain subjected to the cords is also increased and even though the ply including the cords having the small diameter is used, sufficient improvement in the cord breaking resistant property could not be obtained. By the above reasons, the upper limit is made 0.88. In the present invention, the maximum width position of the tire shall be understood to means the maximum width position of the outermost ply of the carcass.

As above described, if three kinds of ply groups are used, a ratio among the diameters of the cords of these three kinds of ply groups is selected to a range of 1:0.89 to 0.62:0.73 to 0.40. The reasons why the lower and upper limits of the above ratio are determined are the same as those described with reference to the ratio between the diameters of the cords of the above described two kinds of ply groups.

The three kinds of ply groups including the cord diameter ratio within the above mentioned range are arranged substantially intermediate the maximum width position of the tire and the bead portion thereof such that a ratio of the number of plies of the ply group including cords having intermediate diameter to the total number of plies excluding the turned-up portion of each ply lies within a range between 0.11 and 0.78, preferably a range between 0.13 and 0.63, and that a ratio of the number of plies of the ply group including cords having small diameter to the total number of plies excluding the turn-up portion of each ply lies within a range between 0.07 and 0.60, preferably a range between 0.10 and 0.55. The reasons why the lower and upper limits of the above ratio are determined are the same as those described with reference to the ratio between the diameters of the cords of the above mentioned two kinds of ply groups.

It is a matter of course that if the total plies are considerably large in number, it is possible to combine at least four kinds of ply groups whose cord diameters are different from one another.

It is preferable that the ply groups whose cord diameters are different from each other are arranged such that one of the plies of one ply group at the boundary surface between these ply groups is wound around the bead core of the other ply group. For example, if two ply groups are employed, the outermost ply from the inner ply group will share the same bead as the outer ply group. How many kinds of ply groups whose cord diameters are different from each other are combined and by what ratio those ply groups are combined are choice of design of tire by taking the conditions of the tire when in use and manufacturing cost into consideration.

As seen from the above, the invention is capable of reducing the number of carcass plies without inducing the cord breaking failure and any other failures, improving the production efficiency and lowering the manufacturing cost. In addition, the invention is capable of increasing resistance to the cord breaking failure without lowering the productivity and without decreasing the resistance to any other failures.

The invention can prevent occurrence of the cord breaking failure up to the end of the tire life. In addition, the cords having the optimum diameter are arranged under the optimum condition in response to the value and distribution of the compressive strain produced in the cords when the tire is rotated under load such that the cord fatigue of all of the plies becomes the same. As a result, the thickness of the carcass can be made smaller than that of the carcass in which all of the plies include cords having small diameter. This can decrease the compressive strain produced in that region of the carcass which is located between the sidewall portion of the tire and the bead portion thereof and can reduce the compressive strain produced in the cord. It is a matter of course that the tire according to the invention can exhibit a cord breaking resistant property which is far superior to that of the conventional tire in which all of the carcass plies include cords having small diameter, thereby completely preventing occurrence of the cord breaking failure. It is a matter of course that the use of the decreased number of plies ensures improvement of the productivity and lowering of the manufacturing cost.

In addition, since the invention can make the carcass smaller in thickness than that of the conventional tire in which all of the carcass plies include cords having small diameter, it is possible to efficiently suppress accumulation of heat in the carcass. Moreover, since the ratio between the cord diameters of adjacent ply groups is limited, it is possible to prevent the shearing strain produced in the boundary surface between the ply groups from becoming increased, thereby improving the separation resistant property of the tire.

In the present invention, the organic textile cord material of the carcass ply is not limited to nylon, but may be formed of rayon, vinylon, polyester, aromatic polyamide fiber having a high elasticity, or the like.

The invention will now be described with reference to concrete examples.

EXAMPLE 1

Figure 4:
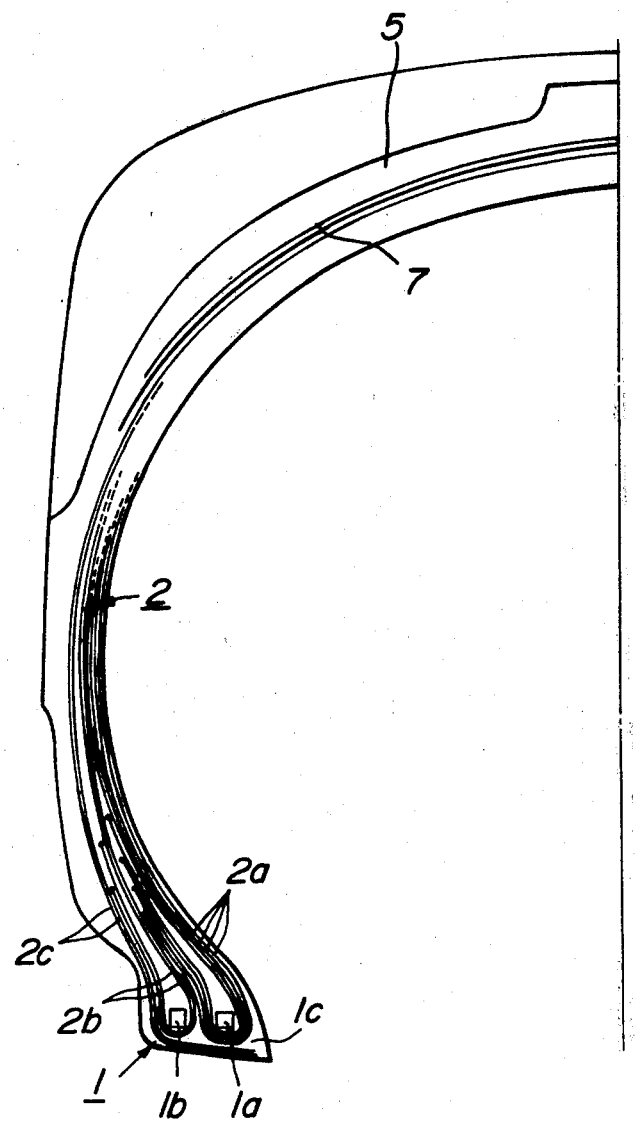

FIG. 4 is a vertical center section through the rotational axis of a tire embodying the present invention. The tire shown in FIG. 4 is a third kind of wide base regular tread tire for construction vehicles having a size of 23.5-25 16PR, 16PR being indicated on the basis of cotton yarn.

In the present embodiment, a bead portion 1 includes two sets of bead cores 1a, 1b. A ply 2 constituting a carcass body is formed of two kinds of nylon cord ply groups consisting of 1,890 denier/2 strands and 1,260 denier/2 strands, respectively. A total number of plies is 8.

Among the total plies, one bundle of plies 2a is composed of 4 nylon cord plies of 1,890 denier/2 strands and is wound around the bead core 1a from the inside of the tire toward the outside thereof to form a turned-up portion. The other bundle of plies 2b is composed of 2 nylon cord plies of 1,260 denier/2 strands and is wound around the bead core 1b from the inside of the tire toward the outside thereof to form a turned-up portion. The remaining bundle of plies 2c is composed of 2 nylon cord plies of 1,260 denier/2 strands and is bent at a bead heel portion from the outside of the tire toward the inside thereof and extends beneath the lower surface of the bead cores 1b, 1a toward a bead toe portion 1c and firmly secured thereto.

The parallel cords of the plies 2a, 2b, 2c are inclined approximately 36° with respect to the circumferential midline of the tire crown portion. The parallel cords of the plies 2b extend in an opposite direction to the parallel cords of the plies 2a and the parallel cords of the plies 2c extend in an opposite direction to the parallel cords of the plies 2b.

At a crown portion 5 of the tire, a breaker 7 composed of 2 nylon cord plies of 840 denier/2 strands is superimposed about the ply 2.

In the present example, the plies 2a formed of the nylon cord plies consisting of 1,890 denier/2 strands have a cord diameter of 0.76 mm, while the plies 2b, 2c formed of the nylon cord plies of 1,260 denier/2 strands have a cord diameter of 0.61 mm. A ratio of these cord diameters is 1:0.80. A ratio of the number of plies of the ply group 2b, 2c including cords of small diameter to total number of plies excluding turned-up portion of each ply is 0.50.

EXAMPLE 2

Figure 5:
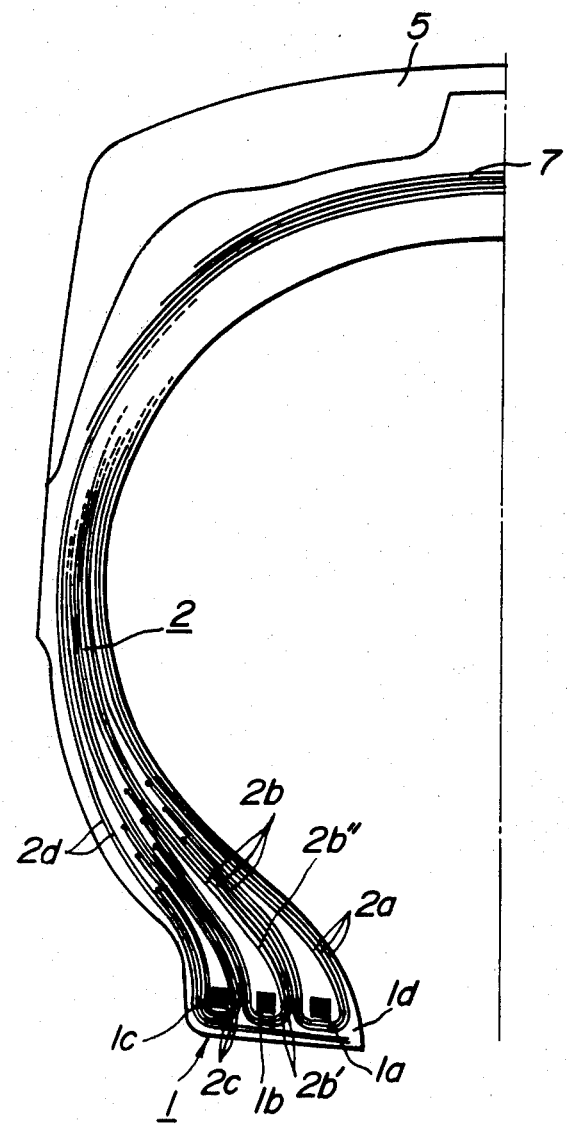

FIG. 5 is a vertical center section through the rotational axis of a tire embodying the present invention. The tire shown in FIG. 5 is a first kind of extra tread tire for construction vehicles having a size of 24.00-49 42PR.

In the present embodiment, a bead portion 1 includes three sets of bead cores 1a, 1b, 1c. A ply 2 constituting a carcass body is formed of two kinds of nylon cord ply groups consisting of 2,520 denier/2 strands and 1,260 denier/2 strands, respectively. A total number of plies is 22. In FIG. 5, 2 plies are designated by one line.

Among the total plies, a bundle of plies 2a is composed of 6 nylon cord plies of 2,520 denier/2 strands and is wound around the bead core 1a from the inside of the tire toward the outside thereof to form a turned-up portion. Another bundle of plies 2b is composed of 6 nylon cord plies consisting of 4 inner plies 2b' of 2,520 denier/2 strands and 2 outer plies 2b" of 1,260 denier/2 strands. This bundle of plies 2b is wound around the bead core 1b from the inside of the tire toward the outside thereof to form a turned-up portion.

A further bundle of plies 2c is composed of 6 nylon cord plies consisting of 1,260 denier/2 strands and is wound around the bead core 1c from the inside of the tire toward the outside thereof to form a turned-up portion. A still further bundle of plies 2d is composed of 4 nylon cord plies of 1,260 denier/2 strands and is bent at a bead heel portion from the outside of the tire toward the inside thereof and extends beneath the lower surface of the bead cores 1c, 1b, 1c toward a bead toe portion 1d and firmly secured thereto.

The parallel cords of the plies 2a, 2b, 2c, 2d are inclined at approximately 35° with respect to the circumferential midline of the tire crown portion. The parallel cords of the plies 2b extend in an opposite direction to the parallel cords of the plies 2a, the parallel cords of the plies 2c extend in an opposite direction to the parallel cords of the plies 2b and the parallel cords of the plies 2d extend in an opposite direction of the parallel cords of the plies 2c.

At a crown portion 5 of the tire, a breaker 7 composed of 4 nylon cord plies of 840 denier/2 strands is superimposed about the ply 2.

In the present example, the plies 2a, 2b' formed of the nylon cord plies consisting of 2,520 denier/2 strands have a cord diameter of 0.90 mm, while the plies 2b", 2c, 2d formed of the nylon cord plies of 1,260 denier/2 strands have a cord diameter of 0.61 mm. A ratio between these cord diameters is 1:0.68. A ratio of the number of plies 2b", 2c, 2d including cords having the smaller cord diameter to the total number of plies excluding the turned-up portions at a region intermediate between the maximum width position of the tire and the bead portion is 0.55.

EXAMPLE 3

FIG. 6 is a vertical center section through the rotational axis of a tire embodying the present invention. The tire shown in FIG. 6 is a third kind of wide base extra deep tread tire for construction vehicles having a size of 37.25-35 36PR.

In the present embodiment, a bead portion 1 includes three sets of bead cores 1a, 1b, 1c. A ply 2 constituting a carcass body is formed of three kinds of nylon cord ply groups consisting of 1,890 denier/2 strands, 1,260 denier/2 strands and 840 denier/2 strands. A total number of plies is 24. In FIG. 6, 2 plies are designated by one line.

Among the total plies, a bundle of plies 2a is composed of 8 nylon cord plies consisting of 6 inside plies 2a' of 1,890 denier/2 strands and 2 outside plies 2a" of 1,260 denier/2 strands. These plies 2a', 2a" as a whole are wound around the bead core 1a from the inside of the tire toward the outside thereof to form a turned-up portion. Another bundle of plies 2b is composed of 6 nylon cord plies consisting of 4 inside plies 2b' of 1,260 denier/2 strands and 2 outside plies 2b" of 840 denier/2 strands. These plies 2b', 2b" as a whole are wound around the bead core 1b from the inside of the tire toward the outside thereof to form a turned-up portion. A further bundle of plies 2c is composed of 6 nylon cord plies consisting of 840 denier/2 strands and is wound around the bead core 1c from the inside of the tire toward the outside thereof to form a turned-up portion. A still further bundle of plies 2d is composed of 4 nylon cord plies of 840 denier/2 strands and is bent at a bead heel portion from the outside of the tire toward the inside thereof and extends beneath the lower surface of the bead cores 1c, 1b, 1a toward a bead toe portion 1d and firmly secured thereto.

The parallel cords of the plies 2a, 2b, 2c, 2d are inclined at approximately 35° with respect to the circumferential midline of the tire crown portion.

The parallel cords of the plies 2b extend in an opposite direction to the parallel cords of the plies 2a, the parallel cords of the plies 2c extend in an opposite direction to the parallel cords of the plies 2b and the parallel cords of the plies 2d extend in an opposite direction of the parallel cords of the plies 2c.

At a crown portion 5 of the tire, a breaker 7 composed of 4 nylon cord plies of 840 denier/2 strands is superimposed about the ply 2.

In the present example, the plies 2a' formed of the nylon cord plies consisting of 1,890 denier/2 strands have a cord diameter of 0.76 mm, the plies 2a", 2b' formed of the nylon cord plies of 1,260 denier/2 strands have a cord diameter of 0.61 mm and the plies 2b", 2c, 2d formed of the nylon cord plies of 840 denier/2 strands have a cord diameter of 0.51 mm. A ratio among these cord diameters is 1:0.80:0.67. A ratio of the number of plies 2a", 2b' having the intermediate cord diameter to the total number of plies excluding the turned-up portion at a region intermediate between the maximum width position of the tire and the bead portion is 0.25, while a ratio of the number of plies 2b", 2c, 2d having the small cord diameter to the above total number of plies at the above mentioned region is 0.50.

What is claimed is:

1. A pneumatic tire comprising a bias laid construction carcass body having a plurality of superimposed stacked plies, each of said plies including rubberized textile cords, the cords of approximately one-half of said plies and the cords of the remaining plies being angularly disposed with respect to the peripheral center line and oppositely inclined with respect to each other, wherein said carcass body comprises outer and inner ply groups having a number of outer and inner plies, respectively, such that the total number of plies is at least 8, said outer and inner plies comprised of outer and inner cords made of the same materials, respectively, said outer cords having a diameter smaller than the diameter of said inner cords such that the ratio of said cord diameter of said inner cords to said outer cords is approximately 1:0.89 to 0.62, said cords in a region of said carcass located between a sidewall portion and a bead portion of said tire periodically experiencing both tensile and compressive forces as said tire is rotated in a loaded condition, the ratio of said number of said outer plies to the total number of inner and outer plies, excluding turned-up portions, at a region intermediate the maximum width portion of said tire and the bead portion thereof, is approximately from 0.13 to 0.67, said bead portion having at least two bead cores and one of the plies of one of the inner and outer ply groups at a boundary surface between the inner and outer ply groups is wound around a first bead core having at least one ply of the other of said inner and outer ply groups wound therearound and the remaining plies of said one of the inner and outer ply groups are wound around a second bead core, wherein all of the plies of one of the inner and outer ply groups are not wound around the first bead core.

2. A pneumatic tire comprising a bias laid construction carcass body having a plurality of superimposed stacked plies, each of said plies including rubberized textile cords, the cords of approximately one-half of said plies and the cords of the remaining plies being angularly disposed with respect to the peripheral center line and oppositely inclined with respect to each other, wherein said carcass body comprises outer, middle and inner ply groups having a number of outer, middle and inner plies, respectively, such that the total number of plies is at least 8, said outer, middle and inner plies comprised of outer, middle and inner cords, respectively made of the same materials, said outer, middle and inner cords having first, second and third diameters, respectively, wherein the ratio of said third diameter to said second diameter is approximately 1:0.89 to 0.62, and the ratio of said third diameter to said first diameter is approximately 1:0.73 to 0.40, said cords in a region of said carcass located between a sidewall portion and a bead portion of said tire periodically experiencing both tensile and compressive forces as said tire is rotated in a loaded condition, said bead portion having at least two bead cores and one of the plies of one of the inner, middle and outer ply groups at a boundary surface between the inner, middle and outer ply groups is wound around a first bead core having at least one ply of another of said inner, middle and outer ply groups wound therearound and the remaining plies of said one of the inner, middle and outer ply groups are wound around a second bead core, wherein all of the plies of one of the inner, middle and outer ply groups are not wound around the first bead core.

3. The pneumatic tire of claim 2, wherein the ratio of said number of (i) said outer plies and (ii) said middle plies to the total number of inner, middle and outer plies, excluding turned-up portions, at a region intermediate the maximum width position of said tire and the bead portion thereof, is approximately between (i) 0.07 and 0.60, and (ii) 0.11 and 0.78, respectively.

4. The pneumatic tire of claims 1 or 2, said bead cores comprise at least an outer and an inner bead core and wherein said outer cords having a smaller diameter comprise a portion of said ply groups wound around at least said outer bead core.

5. The pneumatic tire of claims 1 or 2 wherein said tire comprises three bead cores.

6. The pneumatic tire of claims 1 or 2, wherein said outer ply group is composed of at least two plies extending from the outside of said carcass body beneath the lower surface of said bead cores toward a bead toe portion.

* * * * *